(12) United States Patent
Berrux et al.

(10) Patent No.: US 10,543,520 B2
(45) Date of Patent: Jan. 28, 2020

(54) METHOD OF MANUFACTURING A HEATING ARTICLE PROVIDED WITH A SOL-GEL COATING

(71) Applicant: SEB S.A., Ecully (FR)

(72) Inventors: Aurélien Berrux, La Motte Servolex (FR); Aurélien Dubanchet, Gresy sur Aix (FR); Martin Rubio, Rumilly (FR)

(73) Assignee: SEB S.A. (FR)

( * ) Notice: Subject to any disclaimer, the term of this patent is extended or adjusted under 35 U.S.C. 154(b) by 748 days.

(21) Appl. No.: 15/105,645

(22) PCT Filed: Dec. 19, 2014

(86) PCT No.: PCT/FR2014/053476
§ 371 (c)(1),
(2) Date: Jun. 17, 2016

(87) PCT Pub. No.: WO2015/092332
PCT Pub. Date: Jun. 25, 2015

(65) Prior Publication Data
US 2017/0001230 A1    Jan. 5, 2017

(30) Foreign Application Priority Data

Dec. 20, 2013 (FR) .................................... 13 63221

(51) Int. Cl.
*B21D 22/20* (2006.01)
*B05D 7/14* (2006.01)
(Continued)

(52) U.S. Cl.
CPC ........ *B21D 22/201* (2013.01); *B01J 13/0065* (2013.01); *B05D 1/42* (2013.01); *B05D 3/0209* (2013.01); *B05D 7/14* (2013.01); *B21D 51/22* (2013.01); *C09D 183/04* (2013.01); *C23C 18/00* (2013.01); *C23C 18/127* (2013.01); *C23C 18/1216* (2013.01); *C23C 18/1254* (2013.01);
(Continued)

(58) Field of Classification Search
CPC .................................................... B21D 22/201
USPC ........................................................ 427/376.1
See application file for complete search history.

(56) References Cited

U.S. PATENT DOCUMENTS

| 6,017,489 A | 1/2000 | Woolf et al. |
| 6,207,236 B1 | 3/2001 | Araki et al. |

(Continued)

FOREIGN PATENT DOCUMENTS

| CN | 1222178 A | 7/1999 |
| CN | 1683154 A | 10/2005 |

(Continued)

*Primary Examiner* — Tabatha L Penny
(74) *Attorney, Agent, or Firm* — The Webb Law Firm

(57) ABSTRACT

A method of manufacturing an item, notably a culinary item, includes: providing a support in the form of a preform; preparing a sol-gel composition; hydrolyzing the sol-gel precursor, followed by a condensation reaction; applying onto at least one support surface of the preform at least one layer of the sol-gel composition to form a sol-gel coating layer; and thermally treating the sol-gel coating layer to solidify the coating layer. Further, before thermally treating the sol-gel coating, the method includes pre-densifying the coated preform and stamping the preform to produce a final form of the culinary item.

18 Claims, 2 Drawing Sheets

(51) Int. Cl.
  *B21D 51/22* (2006.01)
  *B05D 3/02* (2006.01)
  *C23C 18/00* (2006.01)
  *C09D 183/04* (2006.01)
  *C23C 18/12* (2006.01)
  *B01J 13/00* (2006.01)
  *B05D 1/42* (2006.01)
  *C08G 77/00* (2006.01)

(52) U.S. Cl.
  CPC ...... *B05D 2202/25* (2013.01); *B05D 2701/10* (2013.01); *C08G 77/80* (2013.01)

(56) References Cited

U.S. PATENT DOCUMENTS

| | | |
|---|---|---|
| 7,635,522 B2 | 12/2009 | Cnossen et al. |
| 8,043,708 B2 | 10/2011 | Kanai et al. |
| 8,715,405 B2 | 5/2014 | Le Blanc et al. |
| 2011/0308989 A1 | 12/2011 | Berrux et al. |

FOREIGN PATENT DOCUMENTS

| | | | |
|---|---|---|---|
| CN | 100349999 C | 11/2007 | |
| CN | 101184866 A | 5/2008 | |
| CN | 102264945 A | 11/2011 | |
| EP | 1457266 A1 * | 9/2004 | ............... B05D 7/14 |
| EP | 1457266 A1 | 9/2004 | |
| EP | 1457267 A1 | 9/2004 | |
| EP | 2505619 A1 | 10/2012 | |
| ES | 2211517 T3 | 7/2004 | |
| FR | 2973804 A | 10/2012 | |
| JP | 2006116876 A | 5/2006 | |

\* cited by examiner

METHOD OF MANUFACTURING A HEATING ARTICLE PROVIDED WITH A SOL-GEL COATING

CROSS-REFERENCE TO RELATED APPLICATIONS

This application is the United States national phase of International Application No. PCT/FR2014/053476 filed Dec. 19, 2014, and claims priority to French Patent Application No. 1363221 filed Dec. 20, 2013, the disclosures of which are hereby incorporated in their entirety by reference.

FIELD OF THE INVENTION

The present invention relates generally to a method of producing an item comprising a support with a sol-gel coating. The present invention relates specifically to a method comprising a stamping step carried out after the sol-gel coating is applied to the support.

It falls under the general domain of heating items, and in particular, the domain of culinary items.

BACKGROUND OF THE INVENTION

The term heating item, in the context of the present invention, refers to an item equipped with its own heating system or an item that is heated by an exterior system and that is capable of transmitting the heat energy introduced by this system to a third material or object in contact with said item, or an item intended to receive another item that has previously been heated.

The term sol-gel coating, in the context of the present invention, refers to a coating synthesized through a sol-gel process from a solution of liquid phase precursors into a solid through a set of chemical reactions (hydrolysis and condensation) at low temperatures. The resulting coating may be either organo-mineral or entirely mineral.

The term organo-mineral coating, in the context of the present invention, refers to a coating for which the network is essentially inorganic, but which includes organic groups, due particularly to the precursors used and the temperature at which the coating is cooked, or due to the incorporation of organic loads.

The term entirely mineral coating, in the context of the present invention, refers to a coating comprised of an entirely inorganic material, free of any organic groups. Such a coating may also be obtained through a sol-gel process with a cooking temperature of at least 400° C., or through the use of tetraethyl orthosilicate (TEOS) type precursors with a cooking temperature that may be less than 400° C.

For a number of years, sol-gel coatings have been gaining preference over coatings based on fluorocarbon resins such as polytetrafluoroethylene (PTFE), for the purposes of creating non-stick coatings for culinary items. However, sol-gel coatings must still be applied to formed, previously stamped items, as inorganic networks cannot be formed without cracking. This translates to a significant reduction in the adherence of the sol-gel coating to the substrate, in addition to a lower resistance to grease penetration in the case of a culinary item in use. In terms of manufacturing, sol-gel coatings are applied to items that have already been stamped. Thus, they cannot be applied with many plate-coating techniques (screen printing, roller, ink jet, curtain coating, etc.), and are generally applied by powder coating with a pneumatic gun. This results in a significant loss of the product during the powder coating (depending on the item's shape, the loss may constitute 30 to 70% of the applied sol-gel composition), and potentially the overspray of the product onto the surface opposite the coated surface, which may be difficult to control.

This is not the case for fluorocarbon coatings (having the ability to be formed, and in particular, drawn), which may be formed and stamped, and are therefore applied onto flat surfaces using plate coating methods prior to thermal treatments and stamping into the desired shape.

SUMMARY OF THE INVENTION

To address these disadvantages, the applicant has developed a method of shaping an item by stamping a metallic object previously coated on at least one surface with a sol-gel coating, using a modified pre-condensation treatment of the sol-gel layer prior to stamping.

More specifically, the present invention relates to a method of producing a culinary item, characterized in that it comprises the following steps:

a) provision of a support in the form of a preform with at least two opposite surfaces;

b) preparation of a sol-gel composition consisting of at least one metal-alkoxide sol-gel precursor;

c) hydrolysis of said sol-gel precursor in the presence of water and an acid or base catalyst, followed by a condensation reaction;

d) application onto at least one support surface of at least one layer of said sol-gel composition of a thickness ranging from 5 to 120 μm, to form a sol-gel coating layer; followed by e) thermal treatment to solidify said sol-gel coating layer.

The method according to the invention furthermore consists of, between the sol-gel composition application step d) and thermal treatment step e), the two following successive steps:

d') pre-densification of the resulting coated preform to produce a sol-gel coating layer with a pencil hardness ranging from 4B to 4H;

d") stamping of said preform to produce the final form of the culinary item, with an interior surface designed to receive food and an exterior surface designed to come into contact with a heat source, the stamped surface may be either the surface equipped with the sol-gel coating layer, or its opposite.

The ability to stamp (or suitability for stamping) of a preform coated with at least one layer of a sol-gel coating, as afforded by the method according to the invention, provides many advantages in terms of both the manufacturing and the aesthetics of culinary items.

Accordingly, the method according to the invention makes it possible to use, during the sol-gel composition application step d), plate coating techniques, which not only results in a significant reduction in the amount of the coating required for manufacturing, but also eliminates the problem of overspray.

Furthermore, working with plate metal before the coating is applied simplifies the surface preparation steps (sand blasting, degreasing, chemical cleaning, etc.)

Aesthetically, it is also highly advantageous to apply the sol-gel composition to the preform using plate coating techniques, as these techniques may be used to produce a wider variety of decorations. In fact, it is much easier to create a decoration on a flat plate (by means of flexography, a roller, ink jet, multi-layered screen printing, etc.), than with powder coating (where masking is required), or with techniques to insert decorations by pad printing on the base of the item, etc.).

For the method according to the invention, the preform used has at least two opposite faces.

Advantageously, the preform is a metallic support. The support may advantageously be aluminum, steel, particularly stainless steel, or copper, titanium, or formed from multiple layers of the aforementioned metals.

Preferably, the preform, and in particular the metallic preform, may be a flat support (for example, disk-shaped).

Advantageously, the method according to the invention may furthermore comprise, prior to the sol-gel composition application step d) a step a') for the treatment of the surface destined to be coated. The surface treatment may consist of a chemical treatment (chemical cleaning in particular) or mechanical treatment (sanding, brushing, grinding, blasting, for example) or physical (plasma treatments in particular), to create a roughness conducive to the adherence of the sol-gel coating layer. The surface treatment may furthermore advantageously be preceded by a degreasing operation to clean the surface.

The sol-gel composition of the method according to the invention is obtained through the hydrolysis of the sol-gel precursor in the presence of water and an acid or base catalyst, followed by a condensation reaction resulting in the sol-gel composition.

The sol-gel composition of the method according to the invention consists of at least one metal-alkoxide sol-gel precursor.

Preferably, the metal alkoxide precursor used would take the general formula (1):

$$R_nM(OR')_{(4-n)}, \qquad (1)$$

where:
R represents an alkyl or phenyl group,
R' represents an alkyl group,
M represents a metal or non-metal selected from Si, Zr, Ti, Al, V, Ce, or La, and
n is between 0 and 3.

Advantageously, the OR' alkoxy group of the metal alkoxide of formula (1) is a methoxy or ethoxy.

Preferably, the metal alkoxide of the general formula (1) is an alkoxysilane, because of the greater reactivity of silanes, their reactive stability and their low cost.

To improve the formability of the one or more layers of the sol-gel coating, as well as adhesion to the metal substrate, in one embodiment of the invention, the sol-gel composition may furthermore consist of at least one metal alkoxide with a non-hydrolyzable function at the level of element M, for example an alkyl or phenyl group.

In one variant of this embodiment, the alkyl group of the non-hydrolyzable function may be a methyl group, corresponding to the alkoxysilane MTES (methyltriethoxysilane).

In a second variation of this embodiment, the method is characterized in that the sol-gel composition furthermore consists of at least one metal alkoxide of the general formula (1):

$$R_nM(OR')_{(4-n)}, \qquad (1)$$

where:
R' represents an alkyl group,
M represents a metal or non-metal selected from Si, Zr, Ti, Al, V, Ce, or La, and
n is between 0 and 3; and R represents a non-hydrolyzable function, said non-hydrolyzable function being a phenyl group or an alkyl chain terminated by an amino, vinyl, methacrylic or epoxy group.

According to this second variant, the alkyl group of the non-hydrolyzable function may comprise an ethylenic double bond, amine function, methacrylic function or epoxide function. In such an embodiment, the alkyl group may advantageously be selected from aminopropyl, methacryloxypropyl, or glycidoxypropyl, which correspond, respectively, to the following alkoxysilanes: APTES (3-aminopropyltriethoxysilane), VTEO (vinyltriethoxysilane), MPTES (3-methacryloxypropyltriethoxysilane) or GPTES (3-glycidoxypropyltriethoxysilane).

Another alternative for the sol-gel composition may advantageously be the use of a silane with a phenyl function, for example a phenyltriethoxysilane (silane having the general formula (1) with R representing a phenyl group), which by means of steric repulsion increases flexibility in the stamping phase.

Furthermore, to improve the flexibility of the sol-gel coating layer (dry film prior to cooking), and thus its suitability for forming in the stamping step, organic or inorganic loads serving as stress buffers may advantageously be incorporated into the sol-gel composition of the method of the invention.

Examples of organic loads that may be used in the context of the method according to the invention include powdered PTFE (for example, BYK CERAFLOUR 998®, sold by the BYK-Chemie company), silicone beads (for example, those sold under the name X52 7030, by the SHIN ETSU company), silicone resins (for example WACKER HK or SILRES® 610, sold by the WACKER company), silicone-epoxy hybrids (Tego Silikopon EF), fluorosilicones, linear or tri-dimensional polysilsesquioxanes (particularly those in liquid or powder forms, for example, those sold by SHIN ETSU under the names KMP 594 and X52 854), powdered polyethylene sulfide (PES), powdered poly ether ketone (PEEK), powdered polyphenylene sulfide (PPS), or perfluoro(propyl vinyl ether) (PFA), powdered fluorinated ethylene propylene (FEP), powdered polyurethane resins, acrylic resins and mixtures thereof.

Examples of inorganic loads that may be used in the context of the method according to the invention include lubricating inorganic loads, preferably in the form of thin layers. These may include, for example, loads selected from alumina, boron nitride, molybdenum sulfide, or graphite.

A first sol-gel composition, which may be used in the method according to the invention and which is to be screen printed onto the preform, may advantageously consist of a mixture of methyltriethoxysilane (MTES) and tetraethyl orthosilicate (TEOS), and preferably a mixture of MTES, TEOS and phenyltriethoxysilane, serving as sol-gel precursors.

A second sol-gel composition, which may be used in the method according to the invention and which is to be screen printed onto the preform, may advantageously consist of a mixture of methyltriethoxysilane (MTES) and tetraethyl orthosilicate (TEOS), serving as sol-gel precursors, and alumina serving as the load.

A third sol-gel composition, which may be used in the method according to the invention and which is to be applied by powder coating onto the preform, may advantageously contain MTES as a sol-gel precursor, with alumina and powdered PTFE serving as the loads.

Once the formulation of the sol-gel composition of the method according to the invention has been prepared, said sol-gel composition is applied to at least one of the surfaces of the support, and in at least one layer of a thickness ranging from 5 to 120 µm (the range indicated for a wet coating layer, prior to drying and cooking), to create one layer of the sol-gel coating.

This application may be performed by screen printing, roller, ink jet, powder coating or curtain coating.

After the application of the sol-gel composition to at least one of the surfaces of the preform, a pre-densification step is carried out on the resulting preform so that the film may reach a pencil hardness between 4B and 4H.

The term pencil hardness, in the context of the present invention, refers to the resistance of the coatings or lacquers to superficial scratches. Accordingly, this hardness indirectly serves as an indication of the sol-gel's condensation state of progress. This pre-densification step for the sol-gel coating layer may advantageously include a drying step at a temperature ranging from 20° C. to 150° C., and more specifically a forced drying step at a temperature ranging from 90° C. to 150° C. in a conventional curing oven. Preferably, in such a configuration involving forced drying of the method according to the invention, the drying time will range from 30 seconds to 5 minutes.

However, this pre-densification step may also be achieved using the following techniques: drying in a heat chamber, drying with UV, IR, plasma, etc.

This pre-densification step is immediately followed by the step for the stamping of said preform that results in the final form of the culinary item, with an interior surface designed to receive food and an exterior surface designed to come into contact with a heat source. With the method according to the invention, it is possible to stamp the preform from either the surface equipped with the sol-gel coating layer or its opposite surface.

Stamping is a method of forming that consists of transforming a flat blank into a hollow of varying geometric complexity. This procedure typically requires a hydraulic or mechanical press equipped with forming tools comprised essentially of a punch (10) and die (11), as illustrated in FIG. 1. Generally, a sheet holder (12) is added to prevent the blank from folding around the punch (10). The constituent material of the preform (2) (typically metal) undergoes a permanent deformation when the punch (10) presses the blank into the die (11). The "stamp" (1) is the hollow body with more or less cylindrical walls and a stamped base.

The absence of any variation between the thickness of the edge of the walls of the stamp is referred to as stamping without drawing.

However, in certain cases, stamping does involve drawing, which makes it possible to, for a given stamp diameter, start from an edge of a smaller diameter.

After the item is shaped, the final sol-gel coating cooking step occurs, which completes the densification of the network. Then, the item undergoes a thermal treatment at a temperature ranging between 150° C. and 350° C.

The present invention also relates to a heating item obtainable by the method according to the invention.

Examples of heating items that may be used according to the present invention include culinary items (such as frying pans, casseroles, woks, crêpe pans, Dutch ovens, stock pots, baking dishes, etc.), or the heating lids and heating mixing bowls of food and beverage preparation devices. The present invention may, however, relate to any other type of surface or article, including tableware items such as trivets, smoothing iron soleplates, curling irons, straightening irons, radiators, towel racks, wood stoves or barbecue grates or grills, or hot plate covers.

BRIEF DESCRIPTION OF THE DRAWINGS

Other advantages and particularities of the present invention will emerge from the following description, provided by way of example and therefore non-limiting, and referencing the examples in the annexed corresponding figures, where.

DETAILED DESCRIPTION OF THE INVENTION

Figure 1:
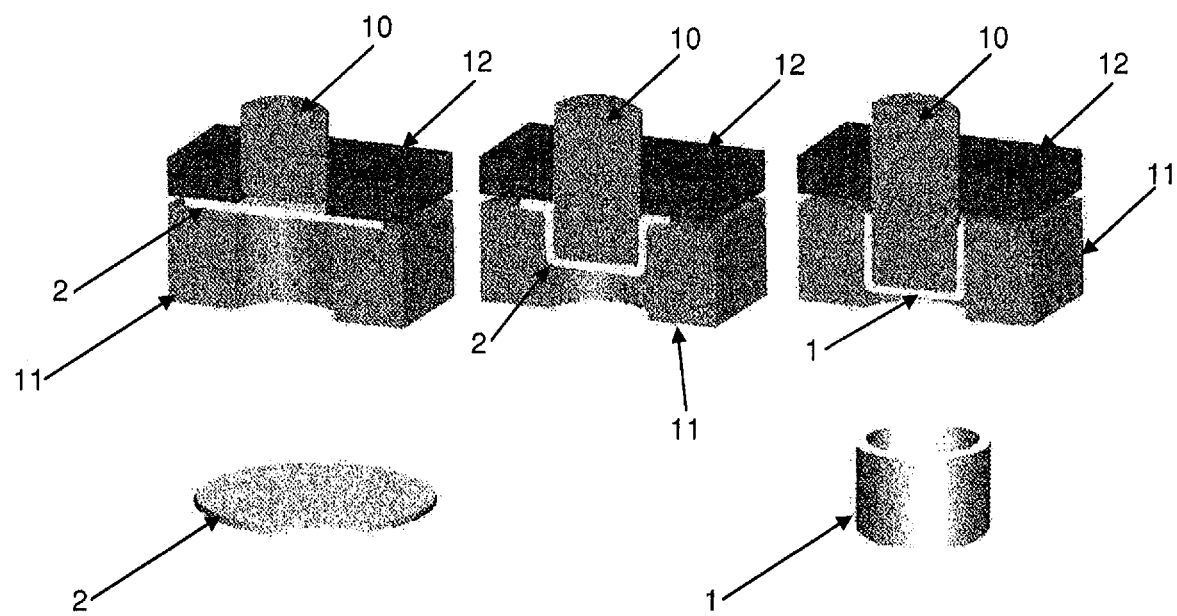
FIG. 1 is a schematic cross-sectional view of a standard hydraulic press in various stages of stamping a preform.
Figure 2:
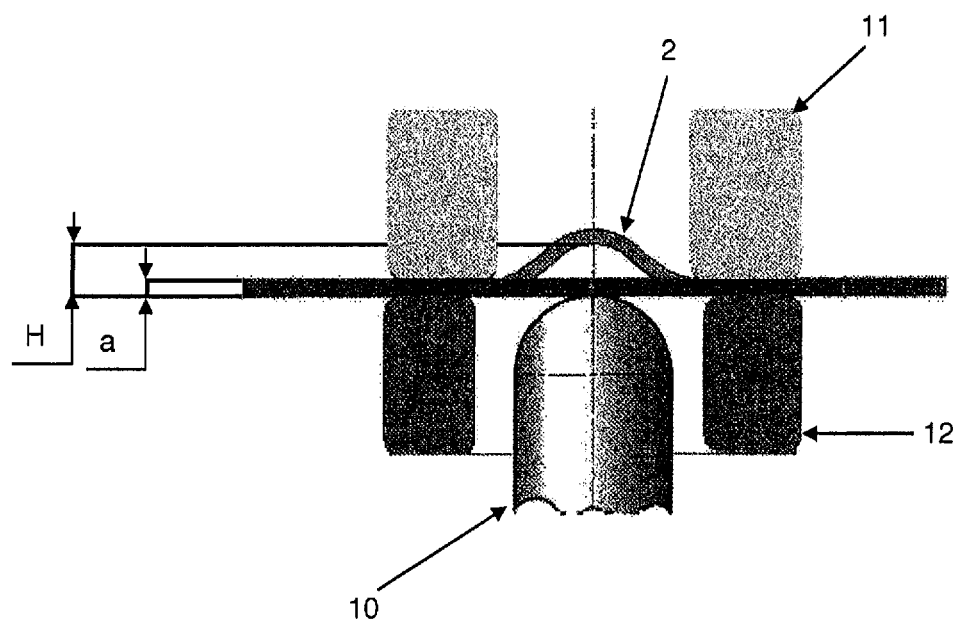
FIG. 2 is an illustration of the Erichsen test used in the examples.
Figure 3:
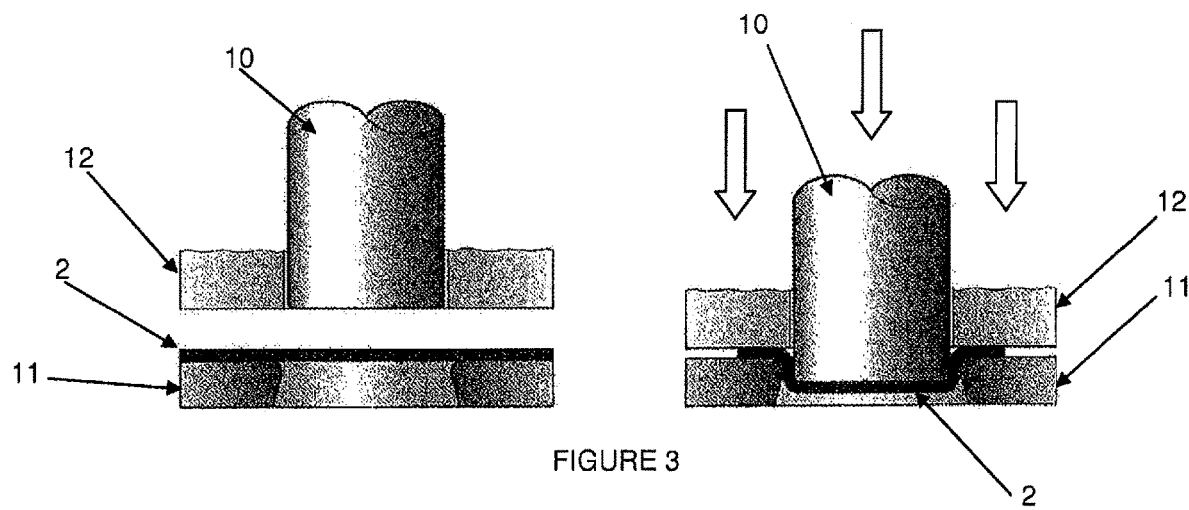
FIG. 3 is an illustration of the Swift test used in the examples.

Identical elements represented in FIGS. 1 through 3 are identified by the same reference numbers.

The invention is illustrated in detail in the following examples.

In these examples, except as indicated, all percentages and proportions are expressed by weight.

EXAMPLES

Products
Supports: Flat Aluminum supports
Compositions:
SG1 black sol-gel composition (for screen printing) using MTES and TEOS.
The composition of SG1 is provided in Table 1 below:

| Components | Mass fraction |
| --- | --- |
| MTES | 38.5 |
| TEOS | 13.3 |
| Propan-2-ol | 1.9 |
| Terpineol | 8.5 |
| Colloidal silica 40% | 22.2 |
| Hydrochloric acid | 0.4 |
| Wetting agent | 0.9 |
| Reactive silicone oil | 0.9 |
| Black pigment (iron oxide) | 7.7 |
| Inorganic load: aluminum | 0.9 |
| Stainless steel beads | 2.1 |
| Cellulosic rheology additive (Dow Ethocel STD 20) | 2.7 |
| TOTAL | 100 |

Copper-colored sol-gel composition SG2 using MTES and TEOS and a phenyl silane (for screen printing application)
The composition of SG2 is provided in Table 2 below:

| Components | Mass fraction |
| --- | --- |
| MTES | 35.5 |
| TEOS | 10.3 |
| Phenylsilane | 5 |
| Propan-2-ol | 1.9 |
| Terpineol | 8.5 |
| Colloidal silica 40% | 22.2 |
| Hydrochloric acid | 0.4 |
| Wetting agent | 0.9 |
| Reactive silicone oil | 0.9 |
| Copper-plated mica-titanium flakes | 4.5 |

-continued

| Components | Mass fraction |
| --- | --- |
| Inorganic load: alumina | 0.4 |
| Stainless steel beads | 4.4 |
| Cellulosic rheology additive (Dow Ethocel STD 20) | 2.6 |
| TOTAL | 100 |

Copper-colored sol-gel composition SG3 using MTES and TEOS and spherical loads (for physical reinforcement) (for screen printing application)

The composition of SG3 is provided in Table 3 below:

| Components | Mass fraction |
| --- | --- |
| MTES | 38.5 |
| TEOS | 13.3 |
| Propan-2-ol | 1.9 |
| Terpineol | 8.5 |
| Colloidal silica 40% | 22.2 |
| Hydrochloric acid | 0.4 |
| Wetting agent | 0.9 |
| Reactive silicone oil | 0.9 |
| Black pigment (iron oxide) | 7.7 |
| Organic load: polysilsesquioxanes | 0.5 |
| Inorganic load: alumina | 0.4 |
| Stainless steel beads | 2.1 |
| Cellulosic rheology additive (Dow Ethocel STD 20) | 2.7 |
| TOTAL | 100 |

Colorless finishing sol-gel composition SF1 using MTES and TEOS (for screen printing application)

The composition of SF1 is provided in Table 4 below:

| Components | Mass fraction |
| --- | --- |
| MTES | 45.5 |
| TEOS | 17.1 |
| Propan-2-ol | 1.9 |
| Terpineol | 8.5 |
| Colloidal silica 40% | 22.2 |
| Hydrochloric acid | 0.4 |
| Wetting agent | 0.9 |
| Reactive silicone oil | 0.9 |
| Cellulosic rheology additive (Dow Ethocel STD 20) | 2.6 |
| TOTAL | 100 |

Sol-gel composition SG4 using MTES only (for powder coating application)

The composition of SG4 is provided in Table 5 below:

| Components | Solution | Mass fraction |
| --- | --- | --- |
| 30% Colloidal silica in water | A | 27 |
| Distilled water | A | 7 |
| Isopropyl alcohol | A | 5 |
| Butyl glycol | A | 3 |
| Black pigment FA1220 | A | 12 |
| Alumina | A | 8.3 |
| Fluorosurfactant | A | 2 |
| Powdered PTFE | A | 3 |
| MTES | B | 32.2 |
| Formic acid | B | 0.5 |
| TOTAL | | 100 |

Colorless finishing sol-gel composition SF2 using MTES only (for powder coating application)

The composition of SF2 is provided in Table 6 below:

| Components | Solution | Mass fraction |
| --- | --- | --- |
| 30% Colloidal silica in water | A | 27.5 |
| Distilled water | A | 10 |
| Isopropyl alcohol | A | 5 |
| Butyl glycol | A | 9 |
| MTES | B | 35.1 |
| TEOS | B | 13 |
| Formic acid | B | 0.4 |
| TOTAL | | 100 |

Tests

Erichsen Test:

This test consists of stamping aluminum blanks (2) clamped between a sheet holder (12) and a die (11) onto a punch (10) with a spherical cap, as illustrated in FIG. 2.

In the context of the present invention, the Erichsen test consists of conducting tests at varying depths (H) of the punch (10). At the conclusion of each test, the behavior of the sol-gel coating is evaluated.

The maximum penetration depth varies in relation to the thickness (a) of the aluminum blank as there should be no necking of the metal.

For our tests, we will evaluate the sol-gel coatings at the following Erichsen depths: 3, 5, 7 and 9 mm, always using the same aluminum blanks (Nuance 3003 alloy, 2.4 mm thickness) sandblasted and degreased.

Swift Test:

This test consists of stamping a cylindrical well in a single pass. Typically, the punch (10) has a diameter of 33 mm and the pressure applied by the sheet holder (12) is adjusted to prevent creasing when the blank (2) is held in place as shown in FIG. 3.

The diameter of the die (11) varies in relation to the sheet thickness (a) and the desired draw ratio, as shown in Table 7 below.

| % Draw | Die diameter in mm |
| --- | --- |
| 0 | 33 + 2a |
| 5 | 33 + 2 × 0.95a |
| 10 | 33 + 2 × 0.90a |
| 15 | 33 + 2 × 0.85a |

The Swift test consists of evaluating the behavior of the sol-gel coating after aluminum plates are stamped using the device illustrated in FIG. 3 under the following conditions: 0%, 5% et 10% drawing. The aluminum plates used are the same as those used for the Erichsen test.

Pencil Hardness According to ISO Standard 15184 (Wolf Wilburn):

The intended objective of this destructive standardized hardness test is to determine the resistance of the sol-gel coating to superficial scratching. The test provides a quick measurement that makes it possible to verify that the underlying conditions (time-temperature parameters) are suitable.

In the context of the present invention, this test was adapted and used to quantify the surface hardness of the sol-gel coating layer just after the pre-densification step d') and before the stamping operation d").

The quantification of hardness is correlated to the physical condition of the coating after densification (macro and microscopic observation). The quantification of hardness after pre-densification makes it possible to rule out many of the pre-densification techniques that could be used in the context of the present invention (drying in a heat chamber, with UV, IR, plasma or even prolonged drying at ambient temperature)

Figure 4:
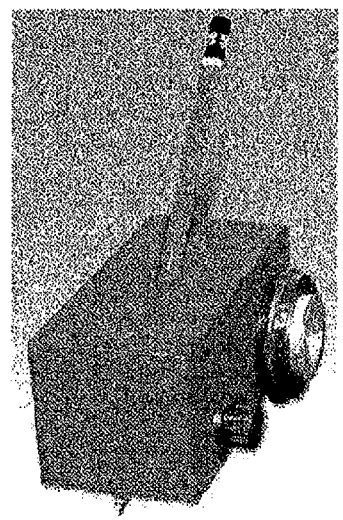
FIG. 4 is an illustration of the pencil hardness test used in the examples.

The principle of the test is to apply, using a pencil of a given hardness (cf. table below) positioned inside a mobile device (as illustrated in FIG. 4), a fixed pressure of 7.5N at a fixed angle of 45 degrees, to the surface to be tested.

The surface of the coating to be tested must be smooth. The first test is performed with a pencil of average hardness, 2H for example, and the coating is then examined (for penetration and damage). If the tested coating is intact after the initial test, the test must be conducted again using a pencil with a greater hardness value following the scale shown below.

The test must be repeated with different leads, until the two pencils with successive hardness values on either side of the threshold are identified: the one that damages the coating and the other that does not damage the coating.

The value recorded in the following table of results is that which produced a scratch on the tested surface. Pencil hardness was evaluated against the following scale:

| | |
|---|---|
| 9H | very hard (or dry) lead |
| 8H | |
| 7H | |
| 6H | |
| 5H | hard lead |
| 4H | |
| 3H | |
| 2H | |
| H | |
| F | |
| HB | lead of average hardness |
| B | |
| 2B | |
| 3B | |
| 4B | |
| 5B | |
| 6B | |
| 7B | |
| 8B | |
| 9B | very soft (or greasy) lead |

Example 1

Preparation and Application by Screen Printing of One Layer of the Sol-Gel Composition SG1, SG2 or SG3, onto which may Optionally be Applied a Colorless Finishing Layer SF1.

The sol-gel compositions SG1, SG2, SG3 and SF1 are prepared as follows:
  reaction of silanes with water, acid, and colloidal silica, to obtain the bonding agent of the screen printable sol-gel coating according to the invention (the reaction is quite rapid, taking as little as several minutes up to one hour according to the quantity of the composition being produced)
  after the stabilization and cooling of the resulting sol-gel bonding agent, pigments and loads are progressively added under dispersion conditions;
  then, the various additives and surfactants are incorporated;
  after a few hours of maturing, the paste is ready to be screen printed;
  the paste may be stored in a refrigerator or at ambient temperature to preserve maximal rheological stability for several days to weeks.

The coating is applied by screen printing in at least one layer of a thickness ranging from 2 to 40 microns. Multiple layers may be applied in succession onto one of the surfaces of the aluminum plate, with an optional drying between each layer.

Optionally, a layer of the translucent sol-gel finishing composition SF1 may be applied onto the one or more layers of the pigmented sol-gel coating composition SG1, SG2 or SG3 described above.

Optionally, a functional or non-functional decoration may also be incorporated between the pigmented sol-gel SG1, SG2 or SG3 layer and the finishing layer SF1.

To add the decoration between these layers, a decoration in the form of at least one discontinuous layer consisting of at least one optically opaque chemical substance onto the first pigmented sol-gel coating layer.

Among the optically opaque chemical substances that may be used for the decoration layer according to the invention, are notably thermostable pigments, thermochromatic pigments, flakes and mixtures thereof. Decoration pastes may be formulated with alkoxysilane binders (referred to as decorative sol-gel pastes), or binders such as silicone resins, polyesters, silicone-polyesters, acrylics, or even with no particular binders.

The one or more decoration layers may, for example, be applied by pad printing, powder coating, screen printing, roller printing or ink jet.

Example 2

Preparation and Screen-Printing of One Layer of the Sol-Gel Composition SG4, onto which may be Optionally Applied a Colorless Finishing Layer SF2.

Sol-gel compositions SG4 and SF2 are prepared as follows:
  Solution A is prepared by successively introducing the colloidal load (alumina or silica), water, an alcohol (to improve compatibility between parts A and B) and the one or more pigments or loads into a planetary mixer to disperse the pigment and obtain a homogenous paste;
  Solution B is separately prepared by mixing the one or more silanes with an organic acid (acetic acid, formic acid, etc.) or base (soda, potash, etc.) to reduce the reactivity of the silane. The content in acid or base ranges from 0.1 to 10% of the mixture by weight. Higher levels are advantageous for extending the pot life of the mixture.
  Solutions A and B may be stored separately in this form for more than six months;
  Solutions A and B are then combined in a mixer to produce an intimate mixture and a hydrolysis reaction. While the mixing process itself may be completed quickly, the mixture must be left to mature for at least 12 hours before being applied onto the support. The pot life of the mixture is at least 48 hours.

The coating is applied in at least one layer of a thickness ranging from 2 to 40 microns by powder coating onto one of the surfaces of the aluminum plate. Multiple layers may be applied in succession, with an optional drying between each layer.

Optionally, a layer of the translucent sol-gel finishing composition SF2 may be applied onto the one or more layers of the pigmented sol-gel coating composition SG4 described above. Optionally, a functional or non-functional decoration may also be incorporated between the pigmented sol-gel SG4 layer and the finishing layer SF2, in the same manner described in Example 1.

Example 3

Testing of the Sol-Gel Coatings in Examples 1 and 2

The properties of the various coatings obtained through tests of each sol-gel coating from Examples 1 (screen printing) and 2 (powder coating) are summarized in Table 8 below.

According to our tests, the approximate range of pencil hardness for a stamping operation falls between 4B to 4H, and preferably between 2B to 2H.

These results show that by controlling the pre-densification conditions of the sol-gel coating (prior to stamping), encouraging results can be achieved in terms of stampability. Furthermore, it is even possible to improve the formability of our system by adding flexible loads to serve as stress buffers. It is therefore possible to obtain stampable sol-gel coatings, with all of the aforementioned industrial and decorative advantages.

d'') stamping of said preform to produce a final form of a culinary item, with an interior surface intended to receive food and an exterior surface intended to come into contact with a heat source.

2. Method as in claim 1, in which the pre-densifying step comprises drying at a temperature ranging between 20° C. and 150° C.

3. Method as in claim 1, in which the sol-gel precursor of the sol-gel composition takes the general formula (1):

$$R_nM(OR')_{(4-n)}, \quad (1)$$

where:
R represents an alkyl or phenyl group,
R' represents an alkyl group,
M represents a metal or non-metal selected from Si, Zr, Ti, Al, V, Ce, or La, and
n is between 0 and 3.

4. Method as in claim 3, in which the sol-gel precursor of general formula (1) is an alkoxysilane.

5. Method as in claim 3, in which the sol-gel composition further comprises at least one metal alkoxide with a non-hydrolyzable function.

| Formulation | Drying conditions | Pencil hardness | Erichsen 3 mm | Erichsen 5 mm | Erichsen 7 mm | Erichsen 9 mm | Swift 0% drawing | Swift 5% drawing | Swift 10% drawing | Swift 15% drawing |
|---|---|---|---|---|---|---|---|---|---|---|
| SG1 | None (a few seconds at ambient temp.) | 8B | Macro chipping | Macro chipping | Macro chipping | Macro chipping | Macro chipping | Macro chipping | Macro chipping | Macro chipping |
| SG1 | 160° C. 3 minutes | 6H | Macro chipping | Macro chipping | Macro chipping | Macro chipping | Macro chipping | Macro chipping | Macro chipping | Macro chipping |
| SG1 | 120° C. 10 minutes | 5H | Macro chipping | Macro chipping | Macro chipping | Macro chipping | Macro chipping | Macro chipping | Macro chipping | Macro chipping |
| SG1 | 120° C. 2 minutes | 4H | OK | OK | Micro cracking | Macro chipping | Micro cracking | Micro cracking | Macro chipping | Macro chipping |
| SG2 | 120° C. 2 minutes | 2H | OK | OK | OK | Micro cracking | OK | Micro cracking | Micro cracking | Macro chipping |
| SG3 | 30 min. at ambient temp | 3B | OK | OK | OK | OK | OK | OK | Micro cracking | Micro cracking |
| SG3 | 120° C. 2 minutes | 2B | OK | OK | OK | OK | OK | OK | Micro cracking | Micro cracking |
| SG3 + SF1 | 120° C. 2 minutes | HB | OK | OK | OK | Micro cracking | OK | Micro cracking | Micro cracking | Macro chipping |
| SG4 | 120° C. 2 minutes | H | OK | OK | OK | OK | OK | Coating OK | Micro cracking | Micro cracking |
| SG4 + SF2 | 120° C. 2 minutes | 4B | OK | OK | OK | Micro cracking | OK | Micro cracking | Micro cracking | Macro chipping |

The invention claimed is:

1. Method of producing a heating item, comprising the following steps:
   a) providing a support in the form of a preform with at least two opposite surfaces;
   b) preparing a sol-gel composition comprising at least one metal-alkoxide sol-gel precursor;
   c) hydrolyzing said sol-gel precursor in the presence of water and an acid or base catalyst, followed by a condensation reaction;
   d) applying onto at least one support surface of the preform at least one layer of said sol-gel composition of a thickness ranging from 5 to 120 μm, to form a sol-gel coating layer; followed by
   e) thermally treating to solidify said sol-gel coating layer to provide a coated preform;
   wherein, between step d) of applying the sol-gel composition onto at least one of the preform surfaces and step e) for thermally treating for solidification, the method includes two successive steps of:
   d') pre-densifying the coated preform to produce a sol-gel coating layer with a pencil hardness ranging from 4B to 4H; followed by 6. Method as in claim 5, in which the non-hydrolyzable function is an alkyl or phenyl group.

7. Method as in claim 6, in which the alkyl group of the non-hydrolyzable function or the alkyl group R of Formula (1) consists of one of an ethylenic double bond, amine function or epoxide function.

8. Method as in claim 7, in which the alkyl group is one of a group selected from aminopropyl, methacryloxypropyl, or glycidoxypropyl.

9. Method as in claim 6, in which the alkyl group is a methyl group.

10. Method as in claim 1, in which the sol-gel composition further comprises at least one organic or inorganic load.

11. Method as in claim 10, in which said load is an organic polymer load, selected from powdered PTFE, silicone beads, silicone resin, linear or tri-dimensional polysilsesquioxanes, powdered polyethylene sulfide (PES), powdered poly ether ketone (PEEK), powdered polyphenylene sulfide (PPS), or perfluoro(propyl vinyl ether) (PFA), powdered fluorinated ethylene propylene (FEP), powdered polyurethane and mixtures thereof.

12. Method as in claim 10, in which said load is a lubricating inorganic charge.

13. Method as in claim 12, in which said inorganic load is one of boron nitride, molybdenum sulfide, or graphite.

14. Method as in claim 1, in which the support is a metal support selected from aluminum, steel, stainless steel, copper, titanium, or multiple layers of said metals.

15. Method as in claim 1, in which the preform is a flat support.

16. Method as in claim 15, in which the step of applying the sol-gel composition to one of the preform surfaces is carried out by one of screen printing, roller, ink jet, powder coating or curtain coating.

17. Method as in claim 1, wherein the thermally treating step e) is a cooking treatment conducted at a temperature ranging between 150° C. and 350° C.

18. Method according claim 1, which furthermore comprises, prior to step d) of applying the sol-gel composition onto at least one of the preform surfaces, a step a') of treating a surface destined to be coated.

* * * * *